United States Patent
Miller et al.

(10) Patent No.: US 8,196,113 B2
(45) Date of Patent: Jun. 5, 2012

(54) REALTIME CREATION OF DATASETS IN MODEL BASED TESTING

(75) Inventors: Michael D. Miller, Rancho Santa Fe, CA (US); Ryan R. Ulaszek, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1164 days.

(21) Appl. No.: 12/021,387

(22) Filed: Jan. 29, 2008

(65) Prior Publication Data

US 2009/0193389 A1    Jul. 30, 2009

(51) Int. Cl.
*G06F 9/44* (2006.01)
(52) U.S. Cl. ......................... 717/127; 717/104
(58) Field of Classification Search .......... None
See application file for complete search history.

(56) References Cited

U.S. PATENT DOCUMENTS

| | | | |
|---|---|---|---|
| 6,577,982 B1 * | 6/2003 | Erb | 702/120 |
| 7,143,073 B2 * | 11/2006 | Barrett | 706/37 |
| 7,464,372 B2 * | 12/2008 | Achlioptas et al. | 717/124 |
| 7,945,898 B1 * | 5/2011 | Episkopos et al. | 717/124 |
| 2005/0268287 A1 * | 12/2005 | Achlioptas et al. | 717/124 |

* cited by examiner

*Primary Examiner* — Li Zhen
*Assistant Examiner* — Evral Bodden
(74) *Attorney, Agent, or Firm* — Park, Vaughan, Fleming & Dowler LLP; Chia-Hsin Suen (57) ABSTRACT

Some embodiments of the present invention provide a system that tests a software program. During operation, the system creates a behavioral model of the software program using branches, decisions, and options. Next, the system applies a weight assignment technique to the behavioral model to create a set of global identifiers (IDs), which correspond to test cases of the behavioral model. The system then generates a test case from the behavioral model and executes the test case on the software program. Finally, the system analyzes an output of the executed test case to determine a validity of the software program.

24 Claims, 10 Drawing Sheets

REALTIME CREATION OF DATASETS IN MODEL BASED TESTING

RELATED APPLICATION

The subject matter of this application is related to the subject matter in a non-provisional application by the same inventors as the instant application and filed on the same day as the instant application, entitled "MODEL-BASED TESTING USING BRANCHES, DECISIONS, AND OPTIONS," and having Ser. No. 12/021,383 (U.S. publication No. 2009/0193391).

BACKGROUND

Related Art

The present invention relates to realtime creation of datasets in model based testing.

"Model-based testing" refers to a test automation approach that allows a tester to create a behavioral model of a software system under test (SUT). The structure of the behavioral model may be based on characteristics of the SUT and expressed using modeling methods such as finite state machines, decision tables, and/or state charts. The behavioral model may then be explored to generate a test vector that, in conjunction with a template script, enables creation of a test suite that exercises the SUT. Model-based testing technologies typically include components that allow a user to create the behavioral model of the SUT, explore the behavioral model, and generate tests from the behavioral model.

Complications may arise from both model generation and exploration in traditional model-based testing technologies. First, the SUT may be described using a behavioral model that is optimized for exploration rather than tester usability. For example, an application may be modeled using a decision table that describes the application in a linear manner. Consequently, each path through the application must be explicitly enumerated in the decision table. The generation of such behavioral models may be repetitious, tedious, or unintuitive to a tester and may cause problems for an organization transitioning from traditional forms of testing to model-based testing.

Second, model exploration may be inefficient or computationally intensive. Specifically, test suites generated from the behavioral model may include tests which traverse the same paths within the SUT. In other words, current test generation mechanisms do not provide the minimum set of tests for complete coverage of executable paths in the application. Moreover, all test cases within a test suite must be instantiated before a particular test case may be identified and executed. Thus, model-based testing may be improved through the use of more efficient and intuitive behavioral models and test generation methods.

SUMMARY

Some embodiments of the present invention provide a system that tests a software program. During operation, the system creates a behavioral model of the software program using branches, decisions, and options. Next, the system applies a weight assignment technique to the behavioral model to create a set of global identifiers (IDs), which correspond to test cases of the behavioral model. The system then generates a test case from the behavioral model and executes the test case on the software program. Finally, the system analyzes an output of the executed test case to determine a validity of the software program.

In some embodiments, the behavioral model is created by:
(i) creating the branches;
(ii) creating a set of decisions for each of the branches;
(iii) creating a set of options for each of the decisions; and
(iv) linking the branches by attaching an option from a branch to another branch.

In some embodiments, the weight assignment technique involves
(i) determining a set of proximate values for each branch of the behavioral model;
(ii) using the proximate values to determine a set of ultimate values for each option of the behavioral model; and
(iii) assigning the global IDs to the test cases using the ultimate values.

In some embodiments, the proximate values and the ultimate values include at least one of an option count, a combination count, a multiplier, and a weighting.

In some embodiments, the test case is generated by:
(i) numerically evaluating the behavioral model using the one of the global IDs;
(ii) instantiating a dataset corresponding to the one of the global IDs from the branches, the decisions, and the options of the behavioral model; and
(iii) using the dataset as the test case.

In some embodiments, the test case is further generated by identifying a dataset group associated with the one of the global IDs.

In some embodiments, the dataset corresponds to a vector that includes a combination of options of the behavioral model.

In some embodiments, each of the global IDs corresponds to a unique dataset in the behavioral model.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Embodiments of the invention provide a method and system for testing a software program, such as a tax-preparation application, a word-processing application, an operating system, and/or an enterprise application. Specifically, embodiments of the invention provide a method and system for model-based testing of the software program. To test the software program, a behavioral model of the software program may be created by a tester of the software program. The behavioral model may then be used to generate one or more test cases which are executed on the software program and used to determine the validity of the software program.

In one or more embodiments of the invention, the behavioral model is created using branches, decisions, and options. Each branch of the behavioral model may correspond to a component of the software program, thus allowing the model to easily adapt to changes in the software program. The behavioral model may also be generated using a graphical user interface (GUI), which may enable the behavioral model to be created with greater ease and efficiency.

In one or more embodiments of the invention, test cases are generated by assigning global identifiers (IDs) to each test case of the behavioral model. The global IDs may be assigned using a weight assignment technique that analyzes the behavioral model using combinatorics. More specifically, the weight assignment technique may determine a set of proximate values for each branch of the behavioral model, use the proximate values to determine a set of ultimate values for each option of the behavioral model, and use the ultimate values as the global IDs. The global IDs may be used to extract datasets containing particular option combinations from the behavioral model, and the datasets may be used as test cases.

Figure 1:
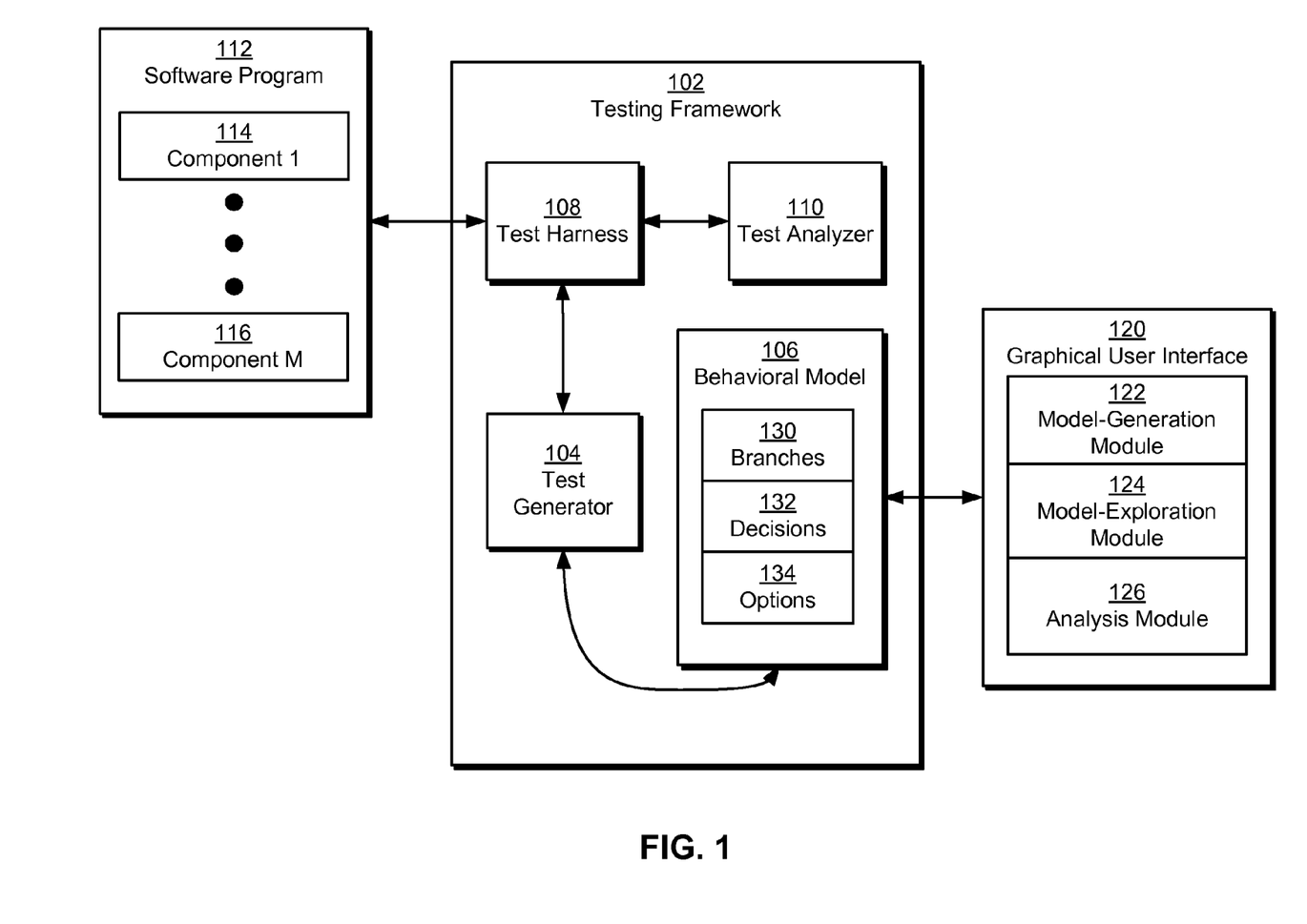
FIG. 1 shows a schematic of a system in accordance with an embodiment of the present invention.

FIG. 1 shows a schematic of a system in accordance with an embodiment of the present invention. As shown in FIG. 1, the system includes a testing framework 102 and graphical user interface 120 for testing a software program 112. Testing framework 102 further includes a behavioral model 106, a test generator 104, a test harness 108, and a test analyzer 110. Each of these components is described in detail below.

Software program 112 may correspond to a standalone application, operating system, enterprise application, database, and/or other type of software. In addition, software program 112 may be executed in a variety of environments. For example, software program 112 may be executed on a single desktop computer or workstation, or software program 112 may be distributed across multiple servers within a data center.

As shown in FIG. 1, software program 112 includes multiple components (e.g., component 1 114, component m 116). Each component may correspond to a module or sub-module within software program 112. For example, an enterprise solution may include one or more components corresponding to databases, business logic layers, user interfaces, network configurations, middleware, and/or other parts of the enterprise solution. In other words, components may refer to individual software modules (e.g., functions, objects, packages, libraries, etc.) that perform specific tasks or store specific information within software program 112. In addition, the functionality of software program 112 may be produced by the interaction of the components with one another. For example, a financial transaction application may include one or more databases for storing data related to financial accounts, financial transactions, and users; business logic and middleware for performing financial transactions; and a user interface to allow users to access and use the application.

Those skilled in the art will appreciate that multiple stages of development and testing may be required to implement, improve, and maintain the various features of software program 112. To streamline the testing process, testing framework 102 may be used to automate the generation and execution of tests on software program 112, as explained below.

In one or more embodiments of the invention, testing framework 102 corresponds to a model-based testing framework. In other words, testing framework 102 may use behavioral model 106 to describe the expected behavior of software program 112. More specifically, behavioral model 106 may correspond to a representation of the components within software program 112, as well as the expected interaction of the components with one another and with a user of software program 112. For example, behavioral model 106 may describe the various financial transactions available to the user of a financial transaction application, as well as sequences of steps involved in making valid financial transactions using the financial transaction application. As a result, behavioral model 106 may describe the structure of software program 112 as well as possible inputs to and outputs from software program 112.

In one or more embodiments of the invention, behavioral model 106 is created by a human tester of software program 112. In other words, the human tester may be responsible for characterizing the expected behavior of software program 112 using behavioral model 106. In addition, behavioral model 106 may be created before, parallel to, or after the creation of software program 112. Alternatively, behavioral model 106 may be automatically created in part or in whole from the software modules within software program 112. For example, a script may be used to map components and sub-components from software program 112 to behavioral model 106.

Figure 2A:
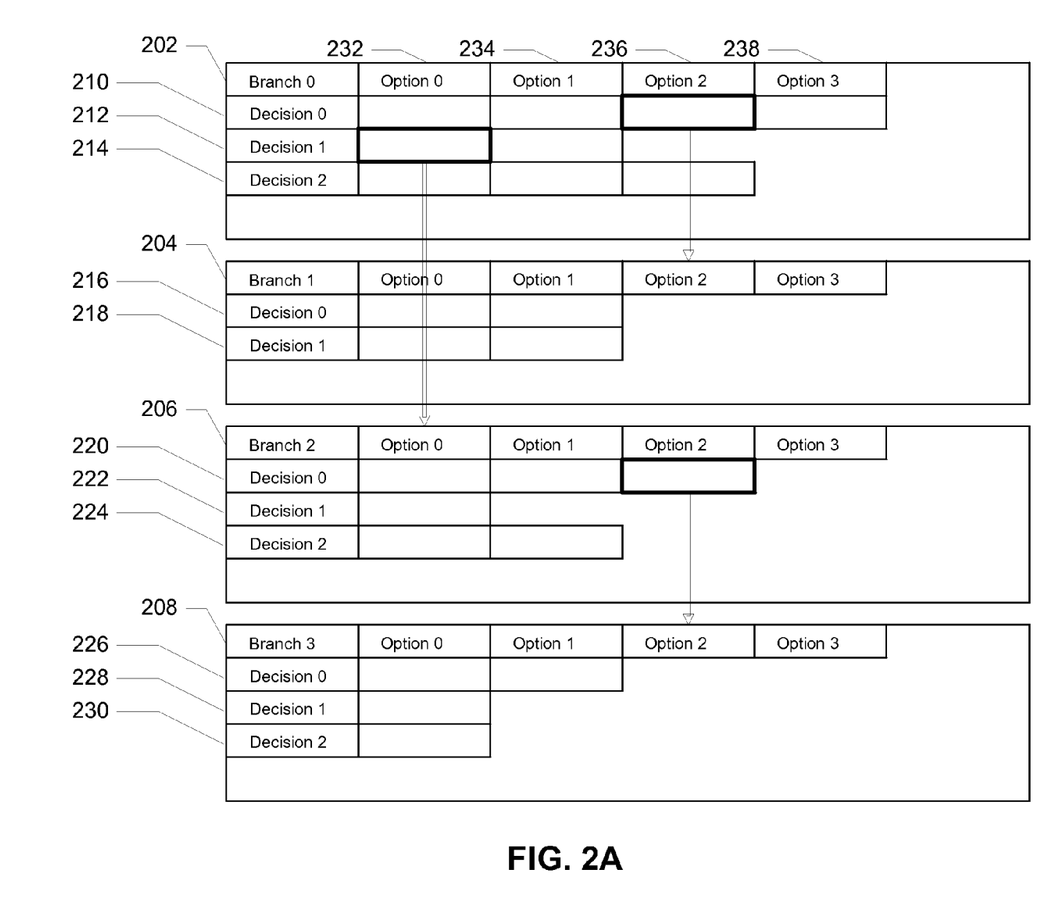
FIG. 2A shows a behavioral model in accordance with an embodiment of the present invention.

As shown in FIG. 1, behavioral model 106 includes a set of branches 130, a set of decisions 132, and a set of options 134. In one or more embodiments of the invention, behavioral model 106 is structured using a dataset model containing branches 130, decisions 132, and options 134. In addition, the use of branches 130, decisions 132, and options 134 in behavioral model 106 may allow the tester to quickly update, change, and/or reuse parts of behavioral model 106 in response to changes to software program 112, as explained below with respect to FIG. 2.

In one or more embodiments of the invention, testing framework 102 generates test cases for software program 112 using test generator 104. For example, test generator 104 may generate a set of testing scripts from behavioral model 106. The testing scripts may be independently executable files or abstract descriptions (e.g., function calls, object instantiations, etc.) of paths through software program 112. Test generator 104 may also use behavioral model 106 to generate human-readable documents (e.g., text files, portable document format (PDF) files, etc.) that assist human testers with manual testing of software program 112. For example, test generator 104 may create a text file that contains a series of steps to be performed on software program 112. A human tester may then perform the steps described in the text file to test one or more aspects of software program 112.

In one or more embodiments of the invention, test generator 104 identifies test cases from behavioral model 106 using a weight assignment technique. The weight assignment technique may assign a global identifier (ID) to each test case in behavioral model 106. In one or more embodiments of the invention, a test case corresponds to a vector that includes a combination of options from the behavioral model. Furthermore, each test case may correspond to a unique dataset (i.e., combination of options) of behavioral model 106. As a result, the weight assignment technique may generate global IDs that represent the minimum number of test cases that provide complete coverage of all paths within software program 112. Moreover, because each test case in behavioral model 106 is enumerated using the weight assignment technique, a particular test case may be identified using its global ID before the test case is instantiated and executed, thus minimizing the amount of computation required to test a particular aspect of software program 112.

Once test cases are produced by test generator 104, the test cases may be executed on software program 112 using test harness 108. In one or more embodiments of the invention, test harness 108 enables communication between software program 112 and testing framework 102 and allows test cases to be run on software program 112. For example, test harness 108 may hook abstract test cases to developed code within software program 112 and monitor the behavior and outputs of software program 112 under the executing test cases. Test harness 108 may also provide the monitored behavior and outputs to test analyzer 110, which may analyze the collected data to determine the validity of software program 112. For example, test analyzer 110 may determine a passing or failing of a test case by examining output values collected by test harness 108 from the test case. Test analyzer 110 may then base the validity of software program 112 on the number and type of passed or failed test cases.

In one or more embodiments of the invention, user input is provided to testing framework 102 using graphical user interface (GUI) 120. In other words, a tester may specify preferences regarding behavioral model 106, test generator 104, test harness 108, and test analyzer 110 using GUI 120. In one or more embodiments of the invention, the tester may use a model-generation module 122 within GUI 120 to generate and update behavioral model 106. For example, the tester may use various GUI components corresponding to branches 130, decisions 132, and options 134 to construct behavioral model 106. Consequently, the tester may experience greater ease and efficiency in generating behavioral model 106 by avoiding extensive programming using model-generation module 122.

To generate and execute tests, the tester may use a model-exploration module 124 within GUI 120. For example, model-exploration module 124 may allow the tester to view a graphical representation of behavioral model 106 and select test cases and/or test suites from one or more GUI components within the graphical representation. Model-exploration module 124 may also allow the tester to specify a particular test case or test suite using the global ID(s) corresponding to the test case or test suite. In one or more embodiments of the invention, a test suite corresponds to a dataset group of the behavioral model. More specifically, the test suite may correspond to test cases that are derived from a particular sequence of global IDs. Model-exploration module 124 may also allow the tester to schedule selected tests. For example, the tester may select test cases and/or test suites from a list displayed within model-exploration module 124 and specify generation and/or execution times for each selected test case and/or test suite.

The tester may use an analysis module 126 within GUI 120 to view test results and analyses from test analyzer 110. The tester may also be able to specify additional actions based on the test results using analysis module 126. For example, the tester may view collected data from the executed test cases, outcomes of the executed test cases, and the analysis of the outcomes from test analyzer 110. The tester may further specify corrective actions in the case of failed tests. For example, the tester may modify the model using model-generation module 122 or report bugs to developers.

FIGS. 2A-2G show the application of a weight assignment technique to a behavioral model in accordance with an embodiment of the present invention. As described above, the behavioral model may be used to describe a software program under test, such as a driver, an operating system, or an application. More specifically, the behavioral model may describe the various paths of the software program. Each path may be assigned a global ID using the weight assignment technique and instantiated using the assigned global ID. As shown in FIG. 2A, the behavioral model includes a set of branches 202-208, a set of decisions 210-230, and a set of options 232-238 associated with each decision.

As described above, the behavioral model may correspond to a dataset model which is structured using branches 202-208, decisions 210-230, and options 232-238. Each decision 210-230 is associated with a branch, and each option 232-238 is associated with a decision. In addition, branches 202-208 are linked through attachments from options of one branch to another branch. For example, branch 0 202 is linked to branch 1 204 through option 2 236 of decision 0 210, branch 2 206 is linked to branch 3 208 using option 2 236 of decision 0 220, and branch 0 202 is linked to branch 2 206 through option 0 232 of decision 1 212.

Each possible path or state of the software program may be represented by the branches, decisions, options, and links of the behavioral model. More specifically, a path may be constructed by the selection of specific options within each decision of a branch, as well as the attachments between selected options and other branches of the behavioral model. For example, branch 0 202 may represent a starting point of the software program. Decisions 210-214 within branch 0 202 and options 232-238 within decisions 210-214 may represent a portion of the possible paths and/or states the software program may be in. In other words, each state and/or path of the software program may be characterized by a particular combination of options within the dataset model.

Furthermore, the number of available states and/or paths may be increased by attaching the options within a branch to another branch. Selection of an option attached to another branch represents an extension of the path and/or number of states to the other branch. For example, four more possible states and/or paths are added to the behavioral model by attaching option 2 236 of decision 0 210 to branch 1 204. As a result, a sequence of steps that correspond to a path through the software program may be represented by the attachment of options from branches to other branches in a particular order. The order is reflected by the unidirectional link between a parent option and a child branch. Referring to FIG. 2A, a path that proceeds from branch 0 202 to branch 2 206 and from branch 2 206 to branch 3 208 may be made by the selection of option 0 232 from decision 1 212 and a subsequent selection of option 2 236 of decision 0 220 within branch 2. Consequently, the behavioral model allows a large number of paths and/or states of the software program to be represented using relatively few constructs.

For example, a tax-preparation application may include a variety of software modules for leading a user through the tax-preparation process. The software modules may include mechanisms for obtaining information and preferences from the user, performing calculations based on the information and preferences, saving the user's progress, and filing tax forms on the user's behalf. Due to the variety of options available, the user may traverse the application in a number of ways. In addition, the user may not use certain modules at all while using some modules multiple times. Such variants on the application's use may require explicit description in models such as state diagrams or decision tables, while the variants may be inherently expressed in the branches, decisions, and options in the behavioral model of FIG. 2A.

Those skilled in the art will appreciate that options 232-238 may refer to options available to a user of the software program as well as to options with respect to the execution of the software program. For example, options may correspond to user-provided preferences or information to the software program. On the other hand, options may correspond to non-user-provided factors such as the availability of a network connection, a native operating system within which the software program is executing, and/or the amount of memory available to the software program.

As described above, the behavioral model of FIG. 2A may be created using a GUI. Each branch, decision, and option of the behavioral model may be represented using a GUI component, such as a table, box, text box, or cell. The GUI components may be created and manipulated by performing common GUI input actions such as clicking, selecting, copying, pasting, dragging, and dropping. Attachments between options and branches may also be placed using GUI elements such as arrows. As a result, creation of the behavioral model using the GUI may further simplify the modeling of the software program.

In one or more embodiments of the invention, each branch 202-208 corresponds to a component of the software program. In other words, each branch 202-208 may refer to a specific software module (e.g., library, package, object, function, etc.) of the software program. In addition, the branches 202-208 may allow the software program to be modeled on different levels of execution. For example, the behavioral model may be constructed using branches that correspond to functions of a particular type (e.g., business logic, user interface, persistence, etc). The mapping of branches to different components of the software program may also allow the software program to be tested using varying levels of specificity. For example, the software program may be tested for correctness by examining specific values of variables as a path through the software program is traversed, or by monitoring the procession of the software program among various modules of the software program.

Those skilled in the art will appreciate that the behavioral model may be updated to reflect changes in the software program by adding and/or removing branches. For example, a new branch or set of branches may be added to the behavioral model to reflect the addition of one or more new components to the software program. Each new branch includes at least one new decision, which includes at least one new option. The new branches may then be linked to other branches of the behavioral model to describe the software program paths that include the new components. Similarly, a portion of the behavioral model may be reused in another behavioral model for another software program if the two software programs contain similar or identical modules. For example, branches corresponding to tax-preparation libraries may be reused in behavioral models for different tax-preparation applications. Similarly, branches corresponding to commonly used tools such as document viewers and editors may be reused in all applications that contain such tools.

In one or more embodiments of the invention, a test case is generated from the behavioral model by traversing part or all of a path through the behavioral model. In other words, the test case may correspond to a dataset containing a series of steps which are determined by the interrelated branches, decisions, and options of the behavioral model. For example, a short test case may include option 3 238 from decision 0 210, option 1 234 from decision 1 212, and option 1 234 from decision 2 214. However, a longer test case may be created by selecting option 2 236 of decision 0 210, which leads to two additional options from branch 1 204 before proceeding to options from decision 1 212 and decision 2 214. Similarly, inclusion of option 0 232 of decision 1 212 may lead to additional options in branch 2 206 and possibly branch 3 208.

As described above, the test cases may be identified using global IDs that are assigned using a weight assignment technique. Furthermore, the weight assignment technique may generate and assign the global IDs by determining a set of proximate values for each branch of the behavioral model, using the proximate values to determine a set of ultimate values for each option of the behavioral model, and using the ultimate values as the global IDs, as explained below.

Figure 2B:
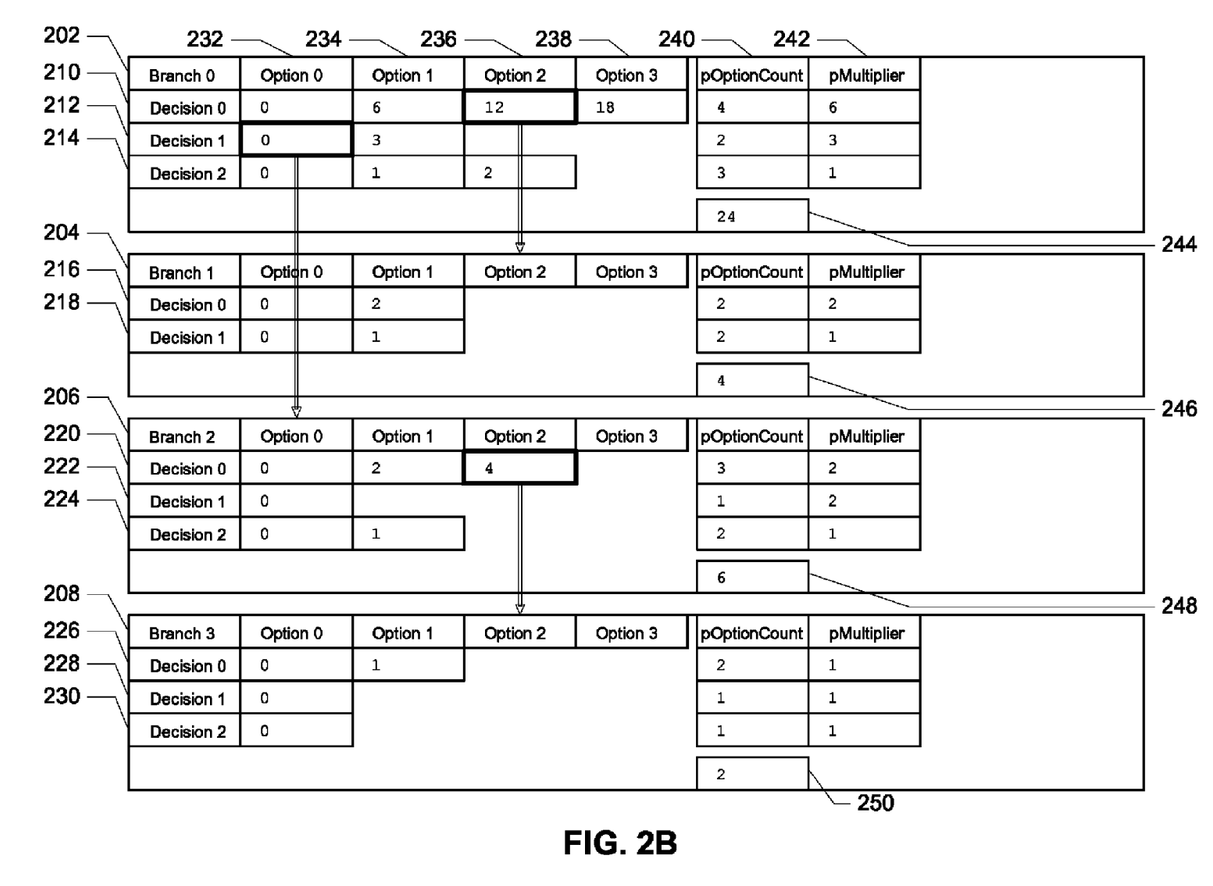
FIG. 2B shows the assignment of proximate values to the branches, options, and decisions of the behavioral model.

FIG. 2B shows the assignment of proximate values to the branches, options, and decisions of the behavioral model. As shown in FIG. 2B, each decision 210-230 of the behavioral model is assigned a proximate option count 240. In one or more embodiments of the invention, proximate option count 240 corresponds to the number of options locally available within each decision. For example, decision 0 210 of branch 0 202 includes four options 232-238, decision 1 212 of branch 0 202 includes two options 232-234, and decision 2 214 of branch 0 202 includes three options 232-236. In addition, attachments between options of a particular decision (e.g., decision 0 210) and other branches (e.g., branch 1 204) are ignored in proximate option count 240.

A proximate combination count 244-250 may also be calculated for each branch 202-208 of the behavioral model. In one or more embodiments of the invention, the proximate combination count refers to the total number of unique option combinations available within a branch. For example, the value of 24 for proximate combination count 244 is calculated from the number of combinations resulting from the selection of one of four options 232-238 within decision 0 210, one of two options 232-234 within decision 1 212, and one of three options 232-236 within decision 2 214. Similarly, proximate combination count 246 is calculated from the selection of one of two different options 232-234 for each of two decisions 216-218 of branch 2 204.

Next, a proximate multiplier 242 is determined for each decision 210-230 of the behavioral model. Proximate multiplier 242 may be determined for the first decision of each branch by dividing the proximate combination count by the proximate option count. For subsequent decisions, proximate multiplier 242 is recursively calculated by dividing the previous proximate multiplier by the proximate option count of the current decision. For example, a value of 6 for proximate multiplier 242 of decision 0 210 is determined by dividing proximate combination count 244 of branch 0 202 (i.e., 24) by proximate option count 240 (i.e., 4) of decision 0 210. A value of 3 for proximate multiplier 242 for decision 1 212 is then calculated by dividing proximate multiplier 242 of decision 0 210 (i.e., 6) by proximate option count 240 of decision 1 212 (i.e., 2). Finally, a value of 1 for proximate multiplier 242 for decision 2 214 is obtained by dividing proximate multiplier 242 of decision 1 212 (i.e., 3) by proximate option count 240 of decision 2 214 (i.e., 3).

The proximate multipliers are then used to determine proximate weightings for each option of the behavioral model. The proximate weightings may correspond to offsets for each option of the behavioral model and may serve to enumerate the options locally within each branch. More specifically, each option is assigned a proximate weighting by multiplying the option's position within the decision by proximate multiplier 242 for the decision. For example, option 0 232 of decision 0 has a proximate weighting of 0, which is obtained by multiplying the position of option 0 232 (i.e., 0) with proximate multiplier 242 of decision 0 210 (i.e., 6). The same method may be used to obtain proximate weightings of 6, 12, and 18 for option 1 234 (i.e., position 1), option 2 236 (i.e., position 2), and option 3 238 (i.e., position 3) of decision 0 210, respectively.

In one or more embodiments of the invention, local IDs for options within each decision are obtained from the proximate weightings of each selected option. For example, branch 0 202 includes 24 possible option combinations enumerated by the numbers 0 through 23. A combination of option 0 232 of decision 0 210, option 1 234 of decision 1 212, and option 2 236 of decision 214 corresponds to a local ID of 5, which is obtained by adding the proximate weightings (i.e., 0, 3, 2) of each selected option. The option combination with the highest local ID is obtained by selecting the last options for each decision of the branch. In branch 0 202, the last option combination is obtained by selecting option 3 238 of decision 0 210, option 1 234 of decision 1 212, and option 2 236 of decision 2 214. The proximate weightings of the selected options (i.e., 18, 3, 2) are then added to obtain a local ID of 23.

Figure 2C:
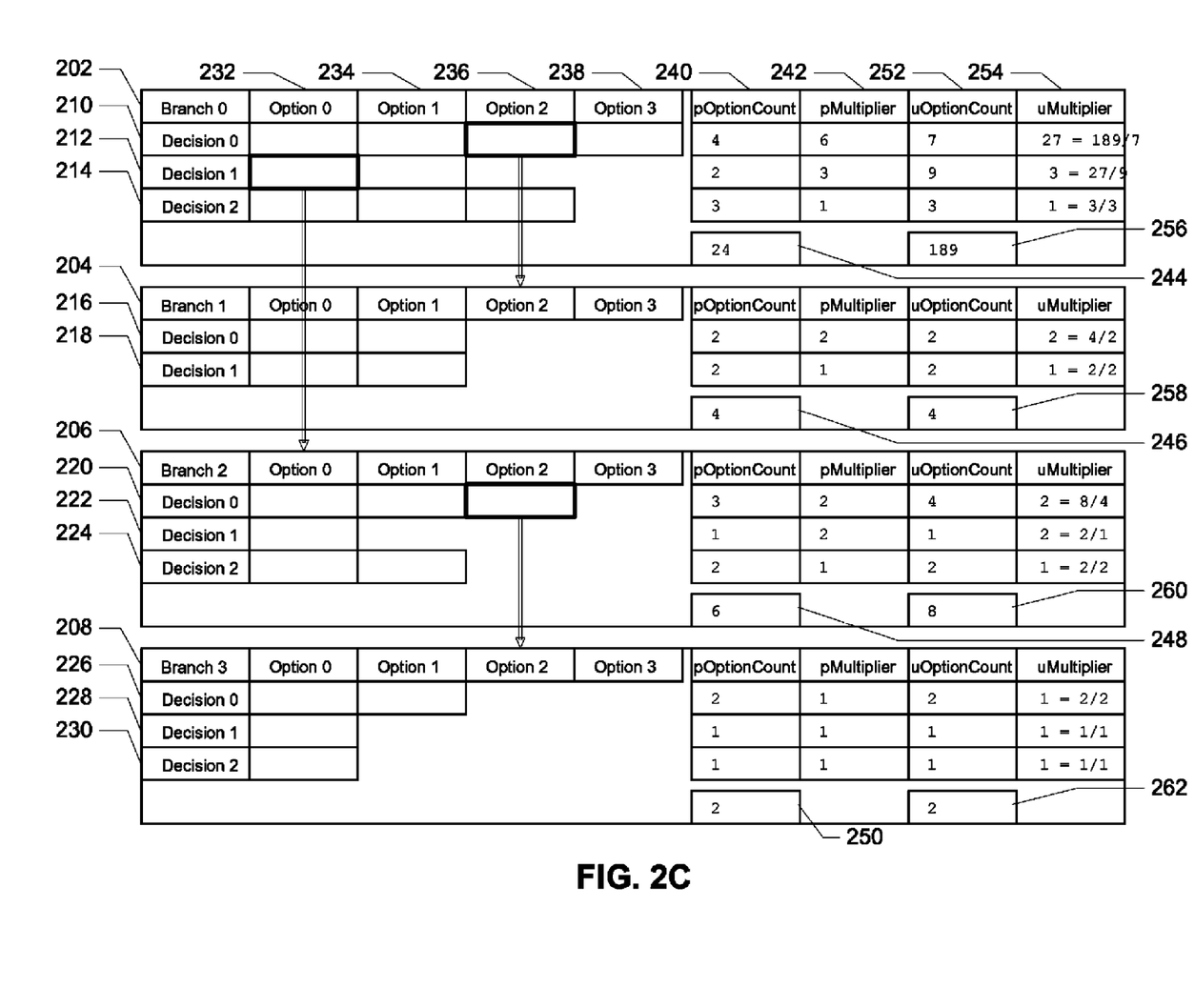
FIG. 2C shows the assignment of ultimate values to the decisions of the behavioral model.

FIG. 2C shows the assignment of ultimate values to the decisions of the behavioral model. As described above, the ultimate values may be used to assign a global ID to each test case of the behavioral model. The test cases may then be identified and instantiated using their respective global IDs. As shown in FIG. 2C, an ultimate option count 252 is calculated for each decision 210-230 of the behavioral model. In one or more embodiments of the invention, ultimate option counts are determined first for branches or decisions with no attached options, and then recursively for branches or decisions with options attached to other branches. Ultimate option counts may be completed last for one or more decisions within the first branch (i.e., branch 0 202) of the behavioral model because the first branch contains a path to every other branch of the behavioral model. One or more decisions within the first branch may consequently contain longer paths to branches with no attached options than other decisions in the behavioral model.

For decisions with no attached branches, ultimate option count 252 is the same as proximate option count 240. Within FIG. 2C, decision 2 214, decision 0 216, decision 1 218, decision 1 222, decision 2 224, decision 0 226, decision 1 228, and decision 2 230 are independent of other branches and thus include ultimate option counts 252 that are the same as their proximate option counts 240. For decisions with attached branches, ultimate option count 252 may be determined by adding the ultimate combination count(s) of a linked branch or branches in place of the attached option(s) within the decision. For example, decision 0 210 of branch 0 202 has an ultimate option count 252 of 7, which is obtained by adding the number of unattached options (i.e., option 0 232, option 1 234, option 3 238) with ultimate option count 240 of attached branch 1 204 (i.e., 4).

Once all ultimate option counts 252 are filled in for a branch, an ultimate combination count 256-262 may be calculated from the ultimate option counts. For example, branch 1 204 is unattached and has ultimate option counts 252 of 2 for each of its decisions 216-218. Ultimate combination count 258 of branch 1 204 is determined by multiplying the ultimate option counts 252, in the same way that proximate option count 246 was determined from the proximate option counts 240. Similarly, ultimate combination count 260 is determined for branch 2 206 by first calculating the ultimate option counts 252 for each decision 220-224 within branch 2 206 (i.e., 4, 1, 2) and then multiplying the ultimate option counts 252.

In one or more embodiments of the invention, ultimate option and combination counts are calculated backwards from decisions with no attached branches to decisions with the longest series of attached branches. For example, ultimate option count 252 for decision 1 212 is calculated by determining calculating ultimate option count 262 for branch 3 208 and using ultimate option count 262 to calculate ultimate option count 252 of decision 0 220 in branch 2 206. Ultimate combination count 260 is then calculated from the ultimate option counts of branch 2 206 and used to calculate ultimate option count 252 of decision 1 212 in branch 0 202. The same process is repeated for other branches and decisions until the value of 189 is obtained for ultimate combination count 256. In other words, the behavioral model includes 189 different unique paths and/or test cases.

An ultimate multiplier 254 for each decision 210-230 is also calculated from the ultimate combination counts in the same way that proximate multiplier 242 is calculated from the proximate combination counts. The first ultimate multiplier is calculated by dividing the ultimate combination count for the branch by the ultimate option count of the first decision. For example, in branch 0 202, a value of 27 for ultimate multiplier 254 is obtained by dividing ultimate option count 256 (i.e., 189) with ultimate option count 252 of decision 0 210 (i.e. 7). Subsequent ultimate multipliers are recursively obtained by dividing the previous ultimate multiplier by the current ultimate option count. For decision 1 212, ultimate multiplier 254 has a value of 3, which is obtained by dividing ultimate multiplier 254 of decision 0 212 (i.e., 27) by ultimate option count 252 of decision 1 212 (i.e., 9). Similarly, ultimate multiplier 254 of decision 2 214 has a value of 1, which is obtained from the division of ultimate multiplier 254 of decision 1 212 (i.e., 3) by ultimate option count 252 of decision 2 214 (i.e., 3).

Figure 2D:
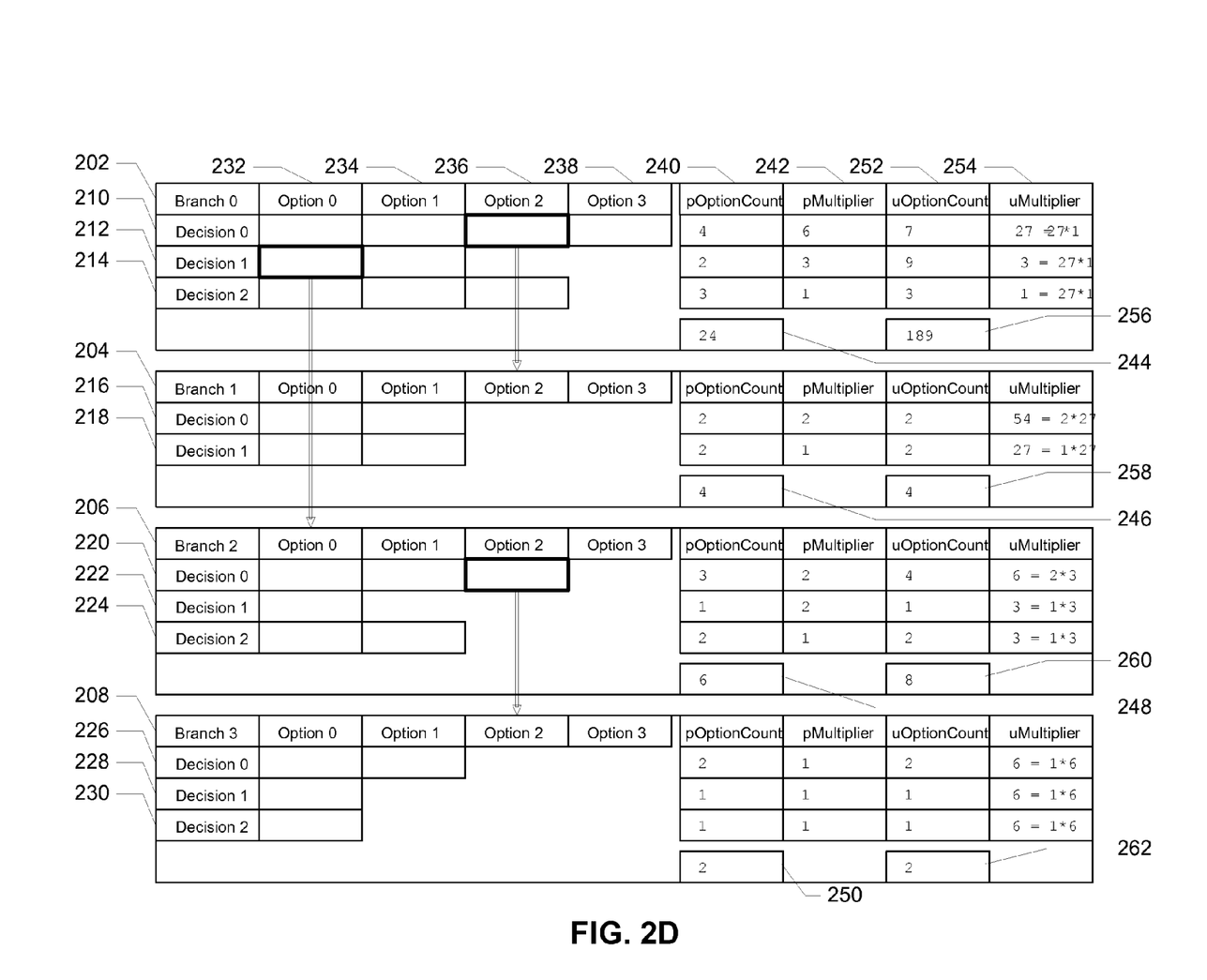
FIG. 2D shows the behavioral model with adjusted ultimate multipliers 252.

FIG. 2D shows the behavioral model with adjusted ultimate multipliers 252. In one or more embodiments of the invention, ultimate multipliers for child branches attached to parent options from other branches are adjusted by multiplying the ultimate multipliers with the ultimate multiplier of a parent (i.e., linking) decision. In one or more embodiments of the invention, ultimate multipliers are adjusted by beginning at the first branch (i.e., branch 0 202) and adjusting the ultimate multipliers of child branches until the branches with no attached options are reached. For example, branch 2 206 is a child of option 0 232 of decision 1 212. As a result, ultimate multiplier 254 for decisions 220-224 is multiplied by 3, the ultimate multiplier of decision 1 212. Similarly, branch 3 208 is a child of option 2 236 of decision 0 220. After adjusting the ultimate multipliers for branch 2 206, ultimate multiplier 254 for decisions 226-230 is multiplied by 6, the ultimate multiplier for decision 0 220 of branch 2 206.

Figure 2E:
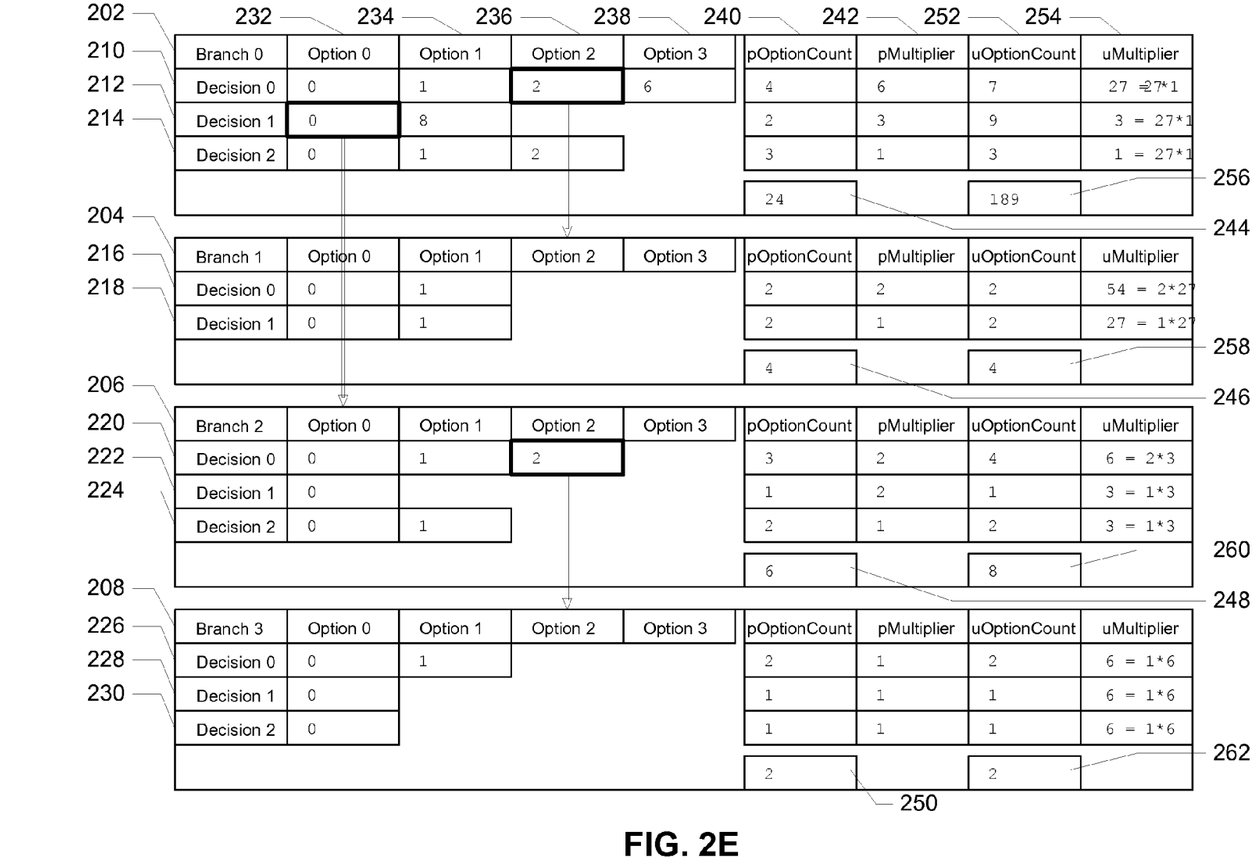
FIG. 2E shows the behavioral model with ultimate indexes set for each option.

FIG. 2E shows the behavioral model with ultimate indexes set for each option. In one or more embodiments of the invention, ultimate indexes are calculated first for branches with no attached options, then backwards to the first branch. In one or more embodiments of the invention, ultimate indexes take into account the shift caused by child branches attached to parent options. For example, branch 3 208 includes options with ultimate indexes that are the same as the options' local weightings. Branch 2 206 links to branch 3, but at the last option of decision 0 220. Consequently, branch 2 206 also includes options with ultimate indexes that are the same as their local weightings.

However, decision 1 212 of branch 0 is attached to branch 2 206 and must include all option combinations within branch 2 206 and branch 3 208. As a result, the ultimate index of option 1 234 of decision 1 212 is set as 8, thus allowing room for the eight possible option combinations available from option 0 232 of decision 1 212. Similarly, the ultimate index of option 3 238 of decision 0 210 is set as 6 to allow for four extra option combinations created by attaching option 2 236 with branch 1 204.

Figure 2F:
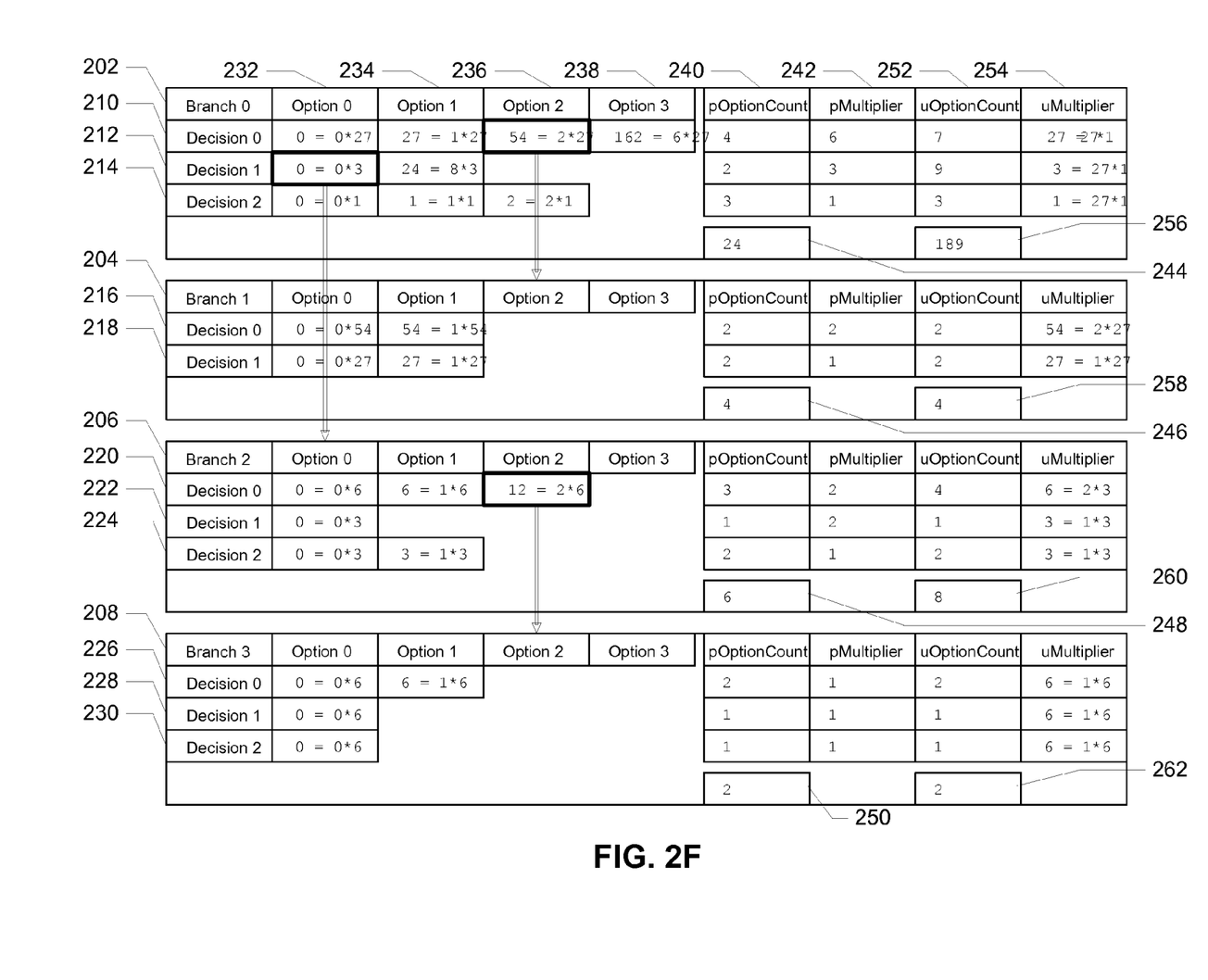
FIG. 2F shows the behavioral model with ultimate weightings set for each option.

FIG. 2F shows the behavioral model with ultimate weightings set for each option. In one or more embodiments of the invention, an ultimate weighting for an option is calculated by multiplying the option's ultimate index by the ultimate multiplier of the decision in which the option is located. For example, decision 0 210 has an ultimate multiplier 254 of 27. Within decision 0, each option's ultimate index is multiplied by 27, resulting in an ultimate weighting of 0 for option 0 232, an ultimate weighting of 27 for option 1 234, an ultimate weighting of 54 for option 2 236, and an ultimate weighting of 162 for option 3 238. The ultimate weightings are also calculated the same way for other options of the behavioral model.

Figure 2G:
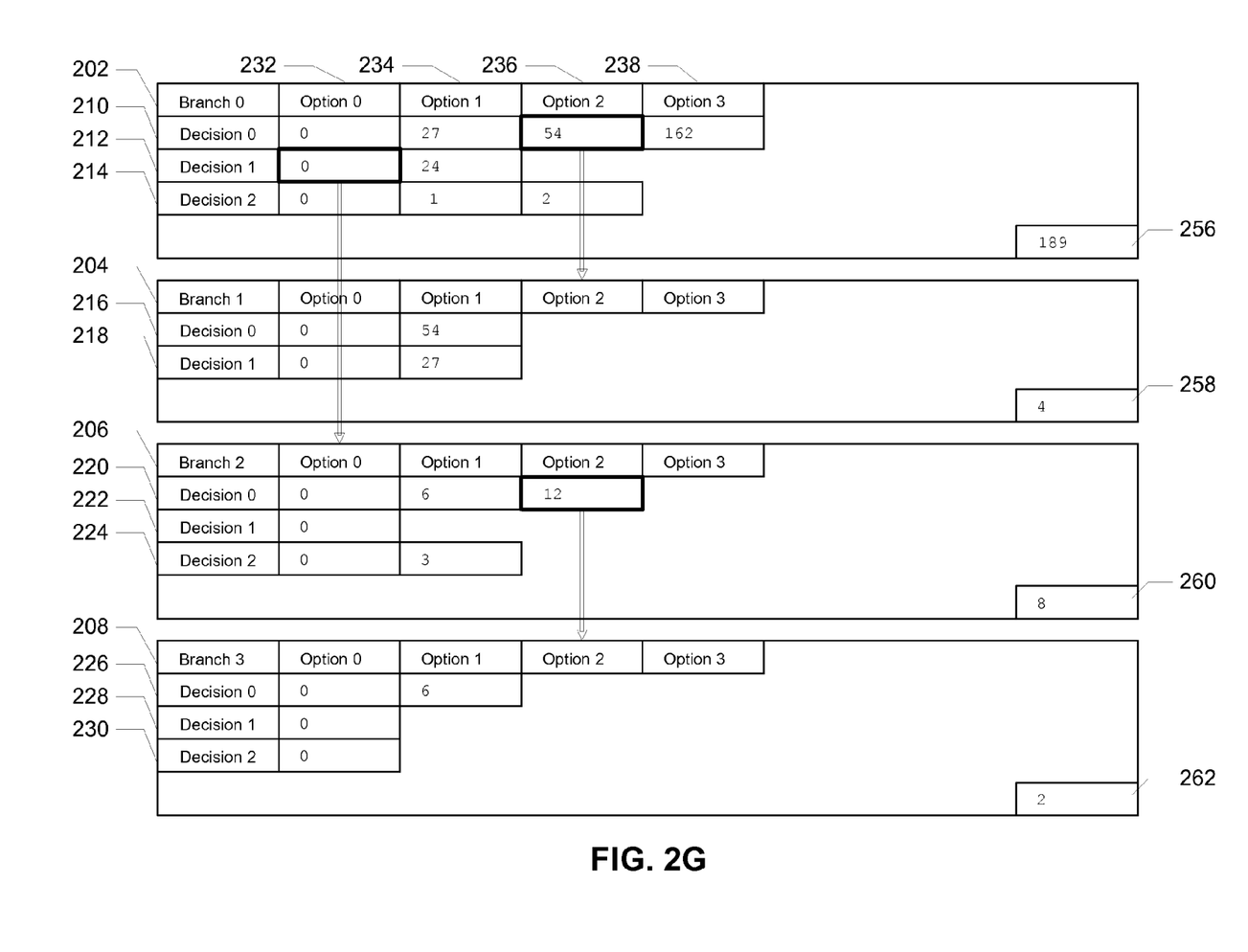
FIG. 2G shows the behavioral model with ultimate weightings set for each option and ultimate combination counts set for each branch.

FIG. 2G shows the behavioral model with ultimate weightings set for each option and ultimate combination counts set for each branch. In one or more embodiments of the invention, the global ID for a test case of the behavioral model is obtained by adding the ultimate weightings for all options selected in the test case. For example, selection of option 0 232 for all decisions 210-230 of the behavioral model results in a global ID of 0, whereas selection of the last option in decisions 210-214 results in the maximum global ID of 188. All other option combinations within the behavioral model produce global IDs between the values of 0 and 188.

As mentioned previously, the global IDs may be used to identify test cases in the behavioral model without instantiating the test cases first. Furthermore, the global IDs map to test cases such that the test cases provide complete, non-redundant coverage of all paths in the behavioral model. Once global IDs are calculated for each test case, a test case may be created by instantiating a dataset corresponding to a particular global ID. The dataset may correspond to a vector that includes a combination of options to be executed, analyzed, and/or tested in a particular order. For example, a particular test case may correspond to a dataset with a combination of option 3 238 from decision 0 210, option 0 232 from decision 1 212, and option 1 234 from decision 2 214. Option 0 232 from decision 1 212 leads to branch 2 206, which may include a combination of options from decisions 220-224. Selection of option 2 236 from decision 0 220 may further lead to an inclusion of options from decisions 226-230 of branch 3 208.

In addition, dataset groups may be identified using the global IDs and used to create test suites. In other words, variations on option choices may be identified by mathematical sequences produced by the assigned ultimate weightings. For example, a dataset group corresponding to combination options within branch 1 204 may be created by adding 0, 27, 54, or 81 to a global ID that includes option 2 236 of decision 0 210.

Figure 3:
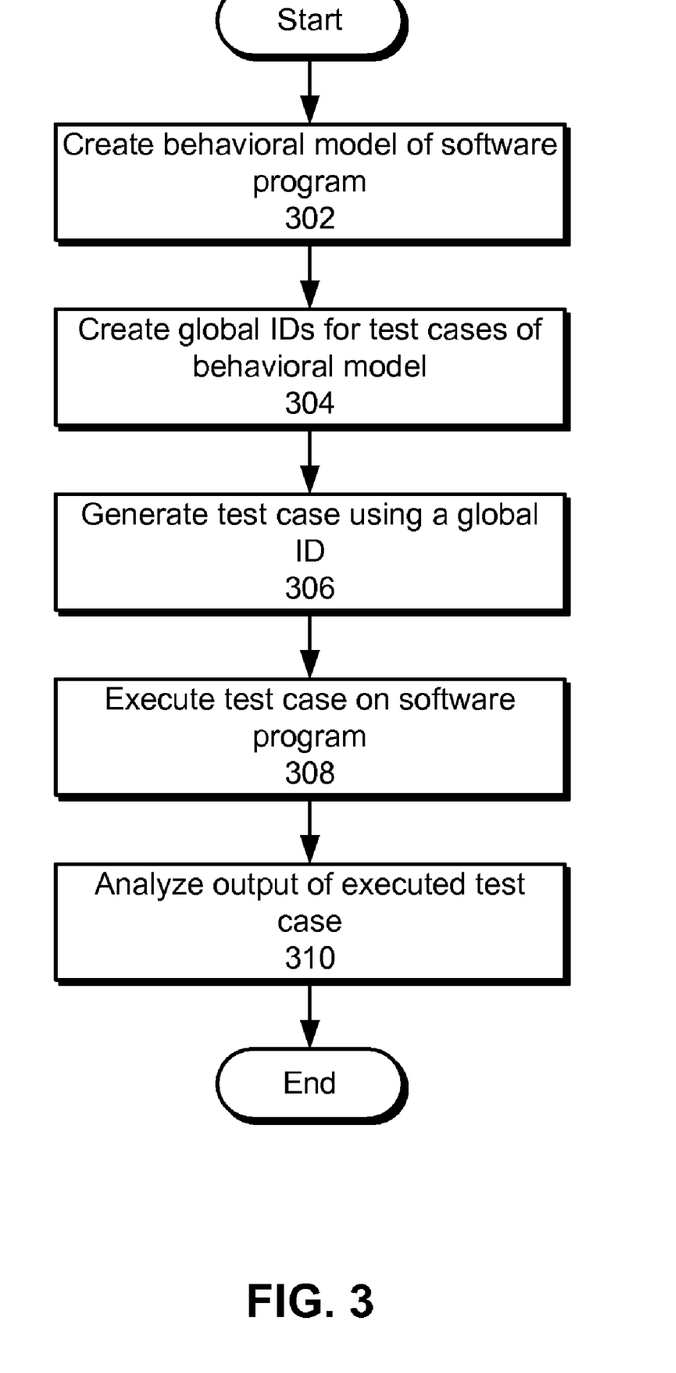
FIG. 3 shows a flowchart of testing a software program in accordance with an embodiment of the present invention.

FIG. 3 shows a flowchart of testing a software program in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a behavioral model of the software program is created (operation 302). The behavioral model may correspond to a dataset model with branches, decisions, and options, as described above. The behavioral model may be generated by a tester of the software program, or the behavioral model may be automatically generated in part or in full from the software program. The behavioral model may also be created in part or in full using a GUI.

Global IDS are created for the test cases of the behavioral model (operation 304). The global IDs may be created using a weight assignment technique, such as the weight assignment technique described in FIGS. 2A-2G. The global IDs may further correspond to unique datasets that provide complete coverage of all paths within the behavioral model. In addition, the global IDs may allow test cases to be individually selected before the test cases are instantiated. Test suites may also be created from dataset groups with specific global ID patterns within the behavioral model.

A test case is then generated from the behavioral model (operation 306). In one or more embodiments of the invention, the test case is generated by numerically evaluating the behavioral model using the corresponding global ID, instantiating a dataset corresponding to the global ID from the branches, the decisions, and the options of the behavioral model, and using the dataset as the test case. In other words, the global ID is used to obtain a particular option combination from the behavioral model, and the option combination is extracted to form a dataset, which is used as the test case.

The test case may then be executed on the software program (operation 308). For example, the test case may be executed by running one or more scripts to access the software program, directly performing function calls on the software program, and/or manually performing the steps of the test case on the software program. An output of the executed test case is then analyzed (operation 310) to determine a validity of the software program. The output may correspond to attributes such as specific values, value ranges, use of appropriate modules within the software program, and/or display of information within the software program's user interface. The test case may form a part of a test suite, which may be used to test different aspects of the software program's execution.

Figure 4:
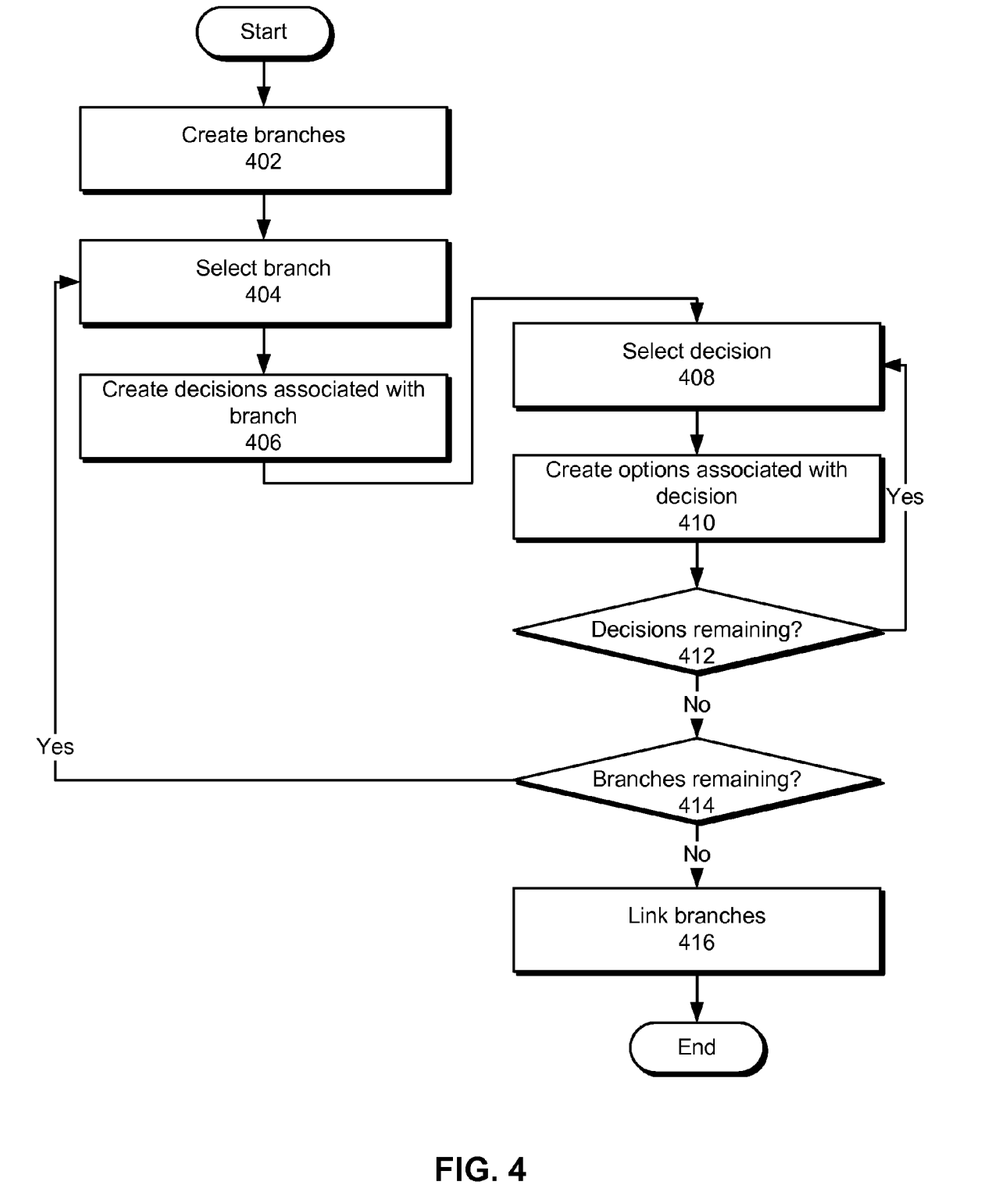
FIG. 4 shows a flowchart of creating a behavioral model in accordance with an embodiment of the present invention.

FIG. 4 shows a flowchart of creating a behavioral model in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

First, branches of the behavioral model are created (operation 402). As described above, the branches may correspond to components (i.e., modules) of a software program, such as libraries, packages, functions, and/or objects. In addition, the branches may be based on components of a particular size to enable testing of the software program at a particular granularity. In one or more embodiments of the invention, each branch includes a number of decisions, and each decision includes a number of options. To populate the branches with decisions, a branch is selected (operation 404) and decisions associated with that branch are created (operation 406). To populate the decisions with options, a decision is selected (operation 408) and a set of options associated with that decision is created (operation 410). For example, in a tax-preparation application, a decision related to a user's tax filing status may include options such as "single," "married filing jointly," "married filing separately," or "head of household." The decision may also be included in the same branch as other decisions corresponding to basic tax information, such as the user's state of residence, the user's name, and/or the user's social security number.

If the selected branch includes other decisions (operation 412), each decision is selected (operation 408) and options are created for that decision (operation 410) until all decisions within the selected branch are populated with at least one option. Similarly, if the behavioral model includes other branches (operation 414), the remaining branches are iterated through and decisions and options are created for each branch (operations 404-414) until all branches are populated with decisions and all decisions are populated with options.

The branches are then linked (operation 416) by attaching options from branches to other branches. In one or more embodiments of the invention, the branches are linked such that a starting branch has a path to every other branch of the behavioral model. In other words, the behavioral model is created such that each option within the behavioral model is accessible through a sequence of steps from the first or starting branch. As a result, the behavioral model characterizes all paths through the software program through the use of branches, decisions, options, and attachments between options and branches.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for testing a software program, comprising, in at least one computer:
    creating a behavioral model of the software program using branches, decisions, and options;
    for a first decision of each branch, determining a proximate multiplier for the first decision by dividing a proximate combination count for the branch by a proximate option count for the decision;
    for each subsequent decision, determining a proximate multiplier for the subsequent decision by dividing a proximate multiplier for a previous decision by a proximate option count for the current decision;
    applying a weight assignment technique to the behavioral model to create a set of global identifiers (IDs), wherein the global IDs correspond to test cases of the behavioral model, and wherein the weight assignment technique uses the proximate multipliers for the first and each subsequent decision;
    generating a test case using one of the global IDs;
    executing the test case on the software program; and
    analyzing an output of the executed test case to determine a validity of the software program.

2. The method of claim 1, wherein the behavioral model is created by:
    creating the branches;
    creating a set of decisions for each of the branches;
    creating a set of options for each of the decisions; and
    linking the branches by attaching an option from a branch to another branch.

3. The method of claim 2, wherein the weight assignment technique involves:
    determining a set of proximate values for each branch of the behavioral model;
    using the proximate values to determine a set of ultimate values for each option of the behavioral model; and
    assigning the global IDs to the test cases using the ultimate values.

4. The method of claim 3, wherein the proximate values and the ultimate values include at least one of an option count, a combination count, a multiplier, and a weighting.

5. The method of claim 1, wherein the test case is generated by:
    numerically evaluating the behavioral model using the one of the global IDs;
    instantiating a dataset corresponding to the one of the global IDs from the branches, the decisions, and the options of the behavioral model; and
    using the dataset as the test case.

6. The method of claim 5, wherein the test case is further generated by:
    identifying a dataset group associated with the one of the global IDs.

7. The method of claim 5, wherein the dataset corresponds to a vector that includes a combination of options of the behavioral model.

8. The method of claim 1, wherein each of the global IDs corresponds to a unique dataset in the behavioral model.

9. A system for testing a software program, comprising:
    a processor;
    a behavioral model of the software program comprising branches, decisions, and options;
    a test case generator configured to:
        for a first decision of each branch, determining a proximate multiplier for the first decision by dividing a proximate combination count for the branch by a proximate option count for the decision;
        for each subsequent decision, determining a proximate multiplier for the subsequent decision by dividing a proximate multiplier for a previous decision by a proximate option count for the current decision;
        apply a weight assignment technique to the behavioral model to create a set of global identifiers (IDs), wherein the global IDs correspond to test cases of the behavioral model, and wherein the weight assignment technique uses the proximate multipliers for the first and the subsequent decisions; and
        generate a test case using one of the global IDs;
    a test harness configured to execute the test case on the software program; and
    a test analyzer configured to analyze an output of the executed test case to determine a validity of the software program.

10. The system of claim 9, further comprising:
    a graphical user interface (GUI),
    wherein the test cases are identified and selected using the GUI.

11. The system of claim 10, wherein the weight assignment technique involves:
    determining a set of proximate values for each branch of the behavioral model;
    using the proximate values to determine a set of ultimate values for each option of the behavioral model; and assigning the global IDs to the test cases using the ultimate values.

12. The system of claim 11, wherein the proximate values and the ultimate values include at least one of an option count, a combination count, a multiplier, and a weighting.

13. The system of claim 9, wherein the test case is generated by:
   numerically evaluating the behavioral model using the one of the global IDs;
   instantiating a dataset from the branches, the decisions, and the options of the behavioral model; and
   using the dataset as the test case.

14. The system of claim 9, wherein the test case is further generated by:
   identifying a dataset group associated with the one of the global IDs.

15. The system of claim 9, wherein each of the global IDs corresponds to a unique dataset in the behavioral model.

16. The system of claim 9, wherein the dataset corresponds to a vector that includes a combination of options of the behavioral model.

17. A computer-readable storage medium storing instructions that when executed by a computer cause the computer to perform a method for testing a software system, the method comprising:
   creating a behavioral model of the software program using branches, decisions, and options;
   for a first decision of each branch, determining a proximate multiplier for the first decision by dividing a proximate combination count for the branch by a proximate option count for the decision;
   for each subsequent decision, determining a proximate multiplier for the subsequent decision by dividing a proximate multiplier for a previous decision by a proximate option count for the current decision;
   applying a weight assignment technique to the behavioral model to create a set of global identifiers (IDs), wherein the global IDs correspond to test cases of the behavioral model, and wherein the weight assignment technique uses the proximate multipliers for the first and the subsequent decisions;
   generating a test case using one of the global IDs;
   executing the test case on the software program; and
   analyzing an output of the executed test case to determine a validity of the software program.

18. The computer-readable storage medium of claim 17, wherein the behavioral model is created by:
   creating the branches;
   creating a set of decisions for each of the branches;
   creating a set of options for each of the decisions; and
   linking the branches by attaching an option from a branch to another branch.

19. The computer-readable storage medium of claim 18, wherein the weight assignment technique involves:
   determining a set of proximate values for each branch of the behavioral model;
   using the proximate values to determine a set of ultimate values for each option of the behavioral model; and
   assigning the global IDs to the test cases using the ultimate values.

20. The computer-readable storage medium of claim 19, wherein the proximate values and the ultimate values include at least one of an option count, a combination count, a multiplier, and a weighting.

21. The computer-readable storage medium of claim 17, wherein the test case is generated by:
   numerically evaluating the behavioral model using the one of the global IDs;
   instantiating a dataset corresponding to the one of the global IDs from the branches, the decisions, and the options of the behavioral model; and
   using the dataset as the test case.

22. The computer-readable storage medium of claim 21, wherein the test case is further generated by:
   identifying a dataset group associated with the one of the global IDs.

23. The computer-readable storage medium of claim 21, wherein the dataset corresponds to a vector that includes a combination of options of the behavioral model.

24. The computer-readable storage medium of claim 17, wherein each of the global IDs corresponds to a unique dataset in the behavioral model.

* * * * *